United States Patent
Trachy et al.

(10) Patent No.: US 9,336,815 B1
(45) Date of Patent: May 10, 2016

(54) DYNAMIC WRITE ONCE READ MANY TAPE CARTRIDGE DESIGNATION

(71) Applicant: Spectra Logic Corporation, Boulder, CO (US)

(72) Inventors: David Lee Trachy, Longmont, CO (US); Walter Wong, Boulder, CO (US)

(73) Assignee: Spectra Logic, Corporation, Boulder, CO (US)

( * ) Notice: Subject to any disclaimer, the term of this patent is extended or adjusted under 35 U.S.C. 154(b) by 0 days.

(21) Appl. No.: 14/680,929

(22) Filed: Apr. 7, 2015

(51) Int. Cl.
*G11B 15/05* (2006.01)
*G11B 15/07* (2006.01)
*G11B 15/087* (2006.01)
*G11B 15/68* (2006.01)

(52) U.S. Cl.
CPC ............. *G11B 15/05* (2013.01); *G11B 15/07* (2013.01); *G11B 15/087* (2013.01); *G11B 15/689* (2013.01); *G11B 15/6895* (2013.01)

(58) Field of Classification Search
None
See application file for complete search history.

(56) References Cited

U.S. PATENT DOCUMENTS

| | | | |
|---|---|---|---|
| 6,947,237 B2 | 9/2005 | Christie | |
| 6,982,846 B2 * | 1/2006 | Jaquette | G06F 21/805 360/69 |
| 7,038,874 B1 * | 5/2006 | Jaquette | G11B 15/04 360/69 |
| 7,075,874 B2 * | 7/2006 | Rushton | G11B 11/10595 360/71 |
| 7,193,803 B2 * | 3/2007 | Jaquette | G06F 21/805 360/69 |
| 7,224,545 B2 * | 5/2007 | Saliba | G11B 5/00813 360/69 |
| 7,469,314 B2 * | 12/2008 | Dahman | G11B 15/07 360/69 |
| 7,650,461 B2 * | 1/2010 | Dahman | G11B 15/07 711/111 |
| 8,280,855 B2 * | 10/2012 | Bish | G11B 5/00813 360/69 |
| 8,538,932 B2 * | 9/2013 | Bish | G11B 5/00813 360/69 |
| 8,612,709 B2 * | 12/2013 | Jesionowski | G11B 5/09 711/163 |
| 8,751,759 B2 * | 6/2014 | Gonzalez | G06F 3/0607 711/114 |
| 8,873,184 B2 * | 10/2014 | Sato | G11B 23/042 360/134 |
| 8,924,673 B2 * | 12/2014 | Bish | G06F 3/0605 711/156 |
| 9,164,921 B2 * | 10/2015 | Bish | G06F 3/0605 |
| 2005/0190611 A1 * | 9/2005 | Rushton | G11B 11/10595 365/189.09 |
| 2011/0145517 A1 * | 6/2011 | Bish | G06F 3/0605 711/154 |

* cited by examiner

*Primary Examiner* — Wayne Young
*Assistant Examiner* — James L Habermehl
(74) *Attorney, Agent, or Firm* — Kenneth Altshuler

(57) ABSTRACT

A data storage library is described that essentially provides a write once and read many (WORM) conversion station located inside of the data storage library. After receiving a request to store data in a WORM arrangement on a tape cartridge in the data storage library and appropriate tape cartridge is selected from a scratch pool of tape cartridges, brought by a robotic transporter to a WORM station where the tape cartridge is converted into a WORM tape cartridge. The WORM tape cartridge can be converted back to a non-write disabled tape cartridge at the WORM station.

20 Claims, 9 Drawing Sheets

DYNAMIC WRITE ONCE READ MANY TAPE CARTRIDGE DESIGNATION

CROSS-REFERENCE TO RELATED APPLICATIONS

None.

BACKGROUND OF THE INVENTION

1. Field of the Invention

The present invention relates generally to tape libraries write protecting tape cartridges in tape libraries.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of protecting stored data from being overwritten, write once and read many (WORM) schemes can be employed on storage media. For example, CDs and DVDs can only be written once. Tape cartridges can be rewritten over and over, but can be write protected by manually toggling a write protect switch turning that tape cartridge into a WORM tape cartridge. The write protect switch on the tape cartridge is designed to be toggled by a human fingernail, obviously outside of any tape library or tape system. In fact, any tape cartridge designated as a WORM tape cartridge is done so when the tape is new and before loading the WORM tape cartridge in a tape library.

It is to improvements directed to WORM designation of tape cartridges that both methods and apparatus are disclosed herein. It is to innovations related to this subject matter that the claimed invention is generally directed.

SUMMARY OF THE INVENTION

The present invention relates generally to dynamic write protect of tape cartridges within tape libraries overcoming the disadvantages and limitations of the prior art by dynamically changing write protect on a tape cartridge using WORM designation station/s within a robotic tape library so as to create a WORM tape cartridge within tape library without the intervention of human hands or the designation of a WORM tape cartridge through software mapping.

One embodiment of the present invention can therefore comprise a method of providing a tape library containing a scratch pool of tape cartridges, at least one tape drive, and a means for altering a tape cartridge, from the scratch pool of tape cartridges, between a write many and read many (WMRM) arrangement and a write once and read many (WORM) arrangement; receiving a request to store data in the WORM arrangement on one of the tape cartridges from the scratch pool; selecting the tape cartridge from the scratch pool; and designating the tape cartridge as a WORM tape cartridge via the means for altering the tape cartridge, the receiving step, the selecting step, and the designating step done entirely within the tape library.

Other embodiments of the present invention may additionally providing a tape library with a scratch pool of tape cartridges, at least one tape drive, a MAM reader and writer independent of the tape drive; receiving a request to store data in a write once and read many (WORM) arrangement on one of the tape cartridges from the scratch pool; selecting a tape cartridge from the scratch pool; designating the tape cartridge as a WORM tape cartridge by storing WORM only instructions on a MAM device located in the tape cartridge via the MAM reader and writer.

Yet further embodiments of the present invention may comprise a method comprising the steps of: providing a tape library containing a scratch pool of tape cartridges, at least one tape drive, and a means for altering a tape cartridge between a write many and read many arrangement and a write once and read many (WORM) arrangement, the scratch pool of tape cartridges; receiving a request to store data in the WORM arrangement on one of the tape cartridges from the scratch pool; selecting the tape cartridge from the scratch pool based on a predefined previous use parameter of the tape cartridge; and designating the tape cartridge as a WORM tape cartridge via the means for altering the tape cartridge, the receiving step, the selecting step, and the designating step done entirely within the tape library.

DETAILED DESCRIPTION

Initially, this disclosure is by way of example only, not by limitation. Thus, although the instrumentalities described herein are for the convenience of explanation, shown and described with respect to exemplary embodiments, which generally include, but are not limited to, dynamically switching a tape cartridge between being write protecting and being able to be overwritten inside of a tape library without intervention of human hands. It will be appreciated that the principles herein may be applied equally in other types of situations involving similar uses of WORM to protect against data overwrite consistent with the scope and spirit of the present invention.

Figure 1:
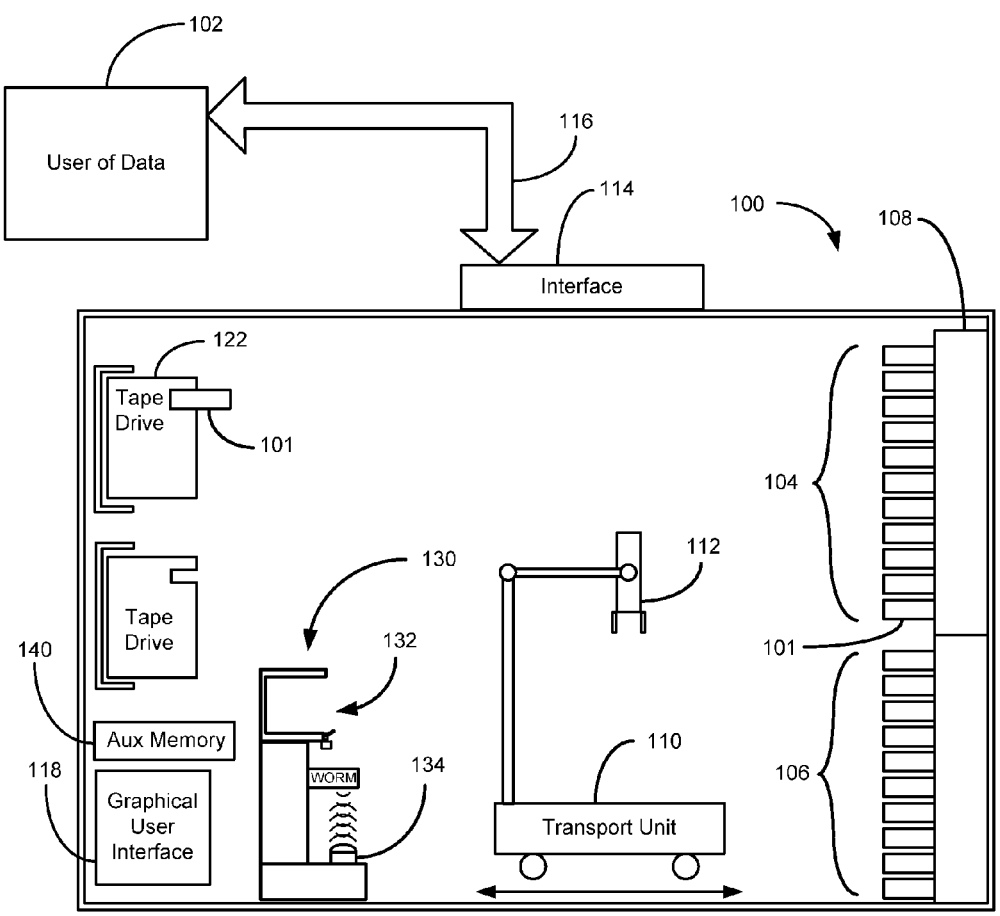
FIG. 1 is an illustration of a data storage arrangement constructed in accordance with an embodiment of the present invention.

Referring to the drawings in general, and more specifically to FIG. 1, shown therein is an illustration of a data storage arrangement constructed in accordance with an embodiment of the present invention. In what follows, similar or identical structures may be identified using identical callouts. FIG. 1 depicts certain basic elements in a data storage library for descriptive purposes. In reality, a data storage library possesses CPUs, keyboard, power lines, fans, CAN (computer area network), buses, switches, and many other electrical and mechanical devices known to those skilled in the art.

The data storage arrangement illustrated in FIG. 1 can comprise a user of data 102, such as a client, in communication with a data storage library 100. As illustratively shown, the client 102 is in communication with the library 100 via a communication path 116 and a library interface device 114. The library 100 comprises a plurality of tape cartridges 101 disposed in a shelf system 108, which in some embodiments contemplates the tape magazine (not shown) which resembles a shoebox containing a plurality of tape cartridges 101. The shelf system holds tape cartridges 101 inside of the data storage library 100. Certain embodiments contemplate each of the tape cartridges 101 containing an auxiliary radio frequency memory device (not shown) capable of storing auxiliary digital data. Other embodiments contemplate each tape cartridge 101 providing a Write protect switch 202 that when toggled changes the tape cartridge 101 from a WMRM tape cartridge to a WORM tape cartridge, shown in FIG. 2.

With continued reference to FIG. 1, depicted are 2 tape drives 122, each capable of reading and writing data to and from one of the plurality of tape cartridges 101. The tape cartridges 101 are moved between the shelf system 108 and the tape drives 122 (or to the WORM station 130) via a robotic transport unit 110. The robotic transport unit 110 further possesses a picker device 112 that is adapted to grasp and release a tape cartridge 101, such as to remove a tape cartridge 101 from the shelf system 108 and insert the tape cartridge 101 in the tape drive 122, for example. Certain embodiments contemplate multiple robotic units 110 and multiple picker devices 112 in a data storage library 100. As further depicted, the data storage library 100 possesses auxiliary memory 140 that can store and maintain data within the data storage library 100 such as the location of each tape cartridge 101, routines the control devices within the data storage library 100, etc. The auxiliary memory 140 can be a hard disk drive, solid state memory device, and the like within the scope and spirit of the present invention. Also depicted is a graphical user interface 118, which an operator can use the input commands or data into the data storage library 100.

In the present configuration, the data storage library 100 is depicted with 2 groups of tape cartridges 101, a scratch pool of WMRM tape cartridges 104 and a pool of WORM tape cartridges 106. The present embodiment of the data storage library 100 further depicts a WORM station 130 that comprises both a Write protect switch toggling station 132 and an RFID reader and writer 134. More specifically, the Write protect switch toggling station 132 is contemplated to provide a mechanical mechanism that physically toggles the Write protect switch 202 of the tape cartridge 101. Embodiments also contemplate the RFID reader and writer 134 designating a tape cartridge 101 to be a WORM tape cartridge 106 by transmitting WORM only instructions to be stored to a MAM (RFID medium auxiliary memory) device (not shown) in the tape cartridges 101. Certain embodiments contemplate the data storage library 100 equipped with just an RFID reader and writer 134 or just a Write protect switch toggling station 132. Other embodiments contemplate multiple RFID readers and writers 134 and/or multiple Write protect switch toggling stations 132. Embodiments contemplate the RFID reader and writer 134 and Write protect switch toggling station 132 being confined within the data storage library 100 as a system used in the data storage library 100 serviced by the robotic transport unit 110 and the picker device 112.

Figure 2A:
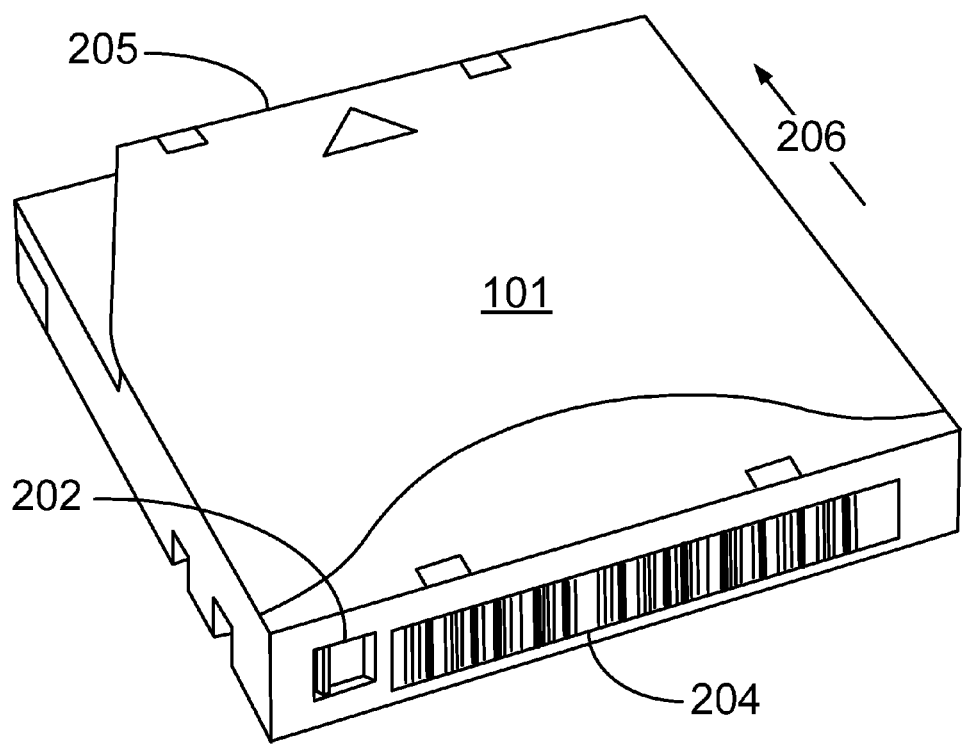
FIG. 2A depicts a perspective illustration of an embodiment of a tape cartridge consistent with embodiments of the present invention.

FIG. 2A depicts a perspective illustration of an embodiment of a tape cartridge 101 consistent with embodiments of the present invention. As shown, the tape cartridge 101 possesses a Write protect switch 202 that when toggled alters the tape cartridge 101 to be either a WMRM tape cartridge or a WORM tape cartridge. A bar code 204 is disposed on the outer facing face of the tape cartridge 101, for reference. The tape cartridge 101 possesses an outer housing 205 that contains the tape medium 208 (shown in FIG. 2B) and the MAM 210 (also shown in FIG. 2B), as well as other components known to those skilled in the art such as, a leader pin, spindle, etc. The arrow 206 indicates the direction to which the tape cartridge 101 is inserted into a tape drive 122.

Figure 2B:
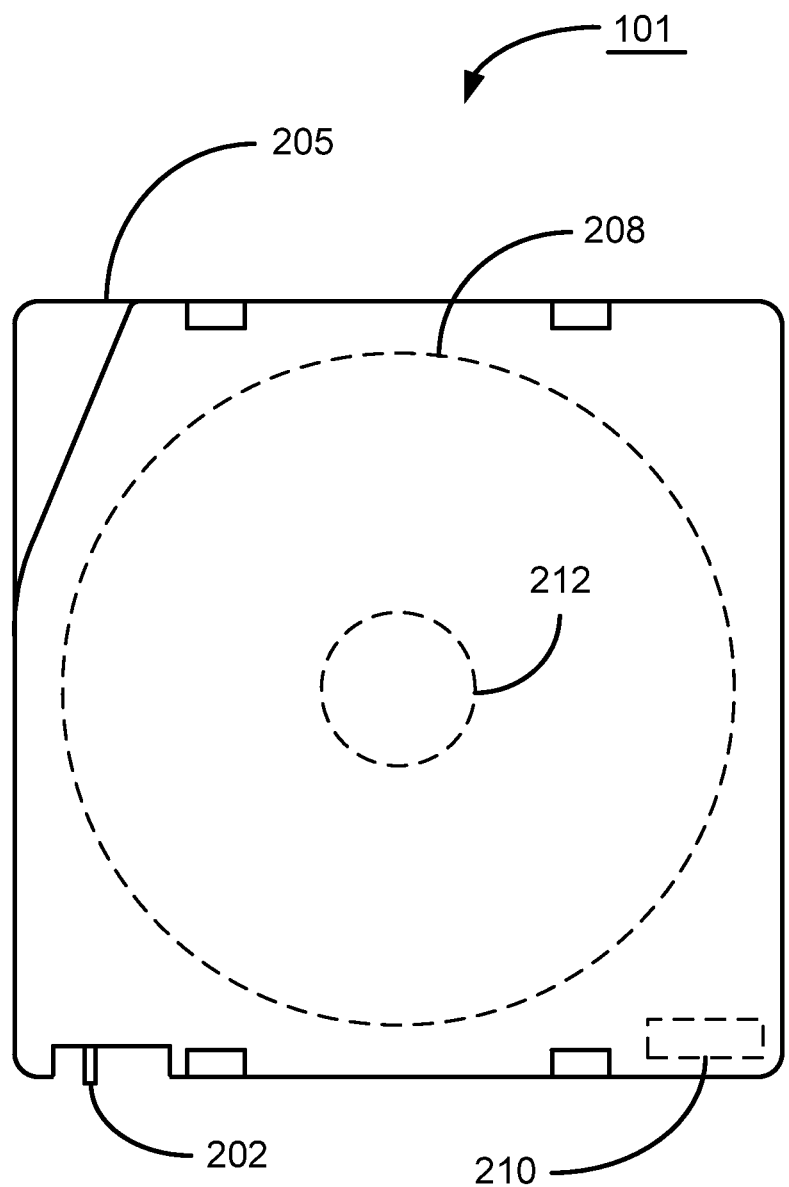
FIG. 2B illustratively depicts the tape cartridge consistent with embodiments of the present invention.

FIG. 2B illustratively depicts the tape cartridge 101 consistent with embodiments of the present invention. As shown by the dashed lines, contained within the tape cartridge housing 205 are the tape medium 208, the spindle 212, and the MAM 210. The tape medium 208 is typically, though not necessarily, a magnetic tape medium which is wrapped around the spindle 212. The MAM 210 is in RFID (radio frequency identification) device that possesses and antenna (not shown), which is activated inductively in the presence of a radio frequency, such as from the MAM reading/writing device 134. In one embodiment, the MAM 210 possesses non-volatile memory which can be parceled into different regions in which data can be stored. For example, a MAM 210 can be parceled into a medium device region which contains information such as serial number, a device region which contains information from the tape drive such as load count, a host/vendor unique region. One embodiment contemplates the host/vendor unique region being capable of containing information such as if the tape cartridge 101 is designated as a WORM tape cartridge or a WMRM tape cartridge. Other embodiments contemplate no constraint to any specific location or parcel in the MAM 210 containing the information of whether or not a tape cartridge 101 is designated as a WORM tape cartridge or a WMRM tape cartridge. One embodiment contemplates a MAM reading/writing device 134 inductively activating the MAM 210 and transmitting instructions to the MAM 210 designating the tape cartridge 101 as either a WORM tape cartridge or a WMRM tape cartridge. The instructions can be a complex string of bits or optionally a single state bit that is toggled between 1 and 0. The data storage library 100 is envisioned to possess the appropriate capacity to identify the tape cartridge 101 as a WORM tape cartridge or a WMRM tape cartridge via a MAM reading device. An MAM reading device, in certain embodiments, is integrated in a tape drive 122. Other embodiments envision an MAM reading device in various locations around the data storage library 100.

Figure 3:
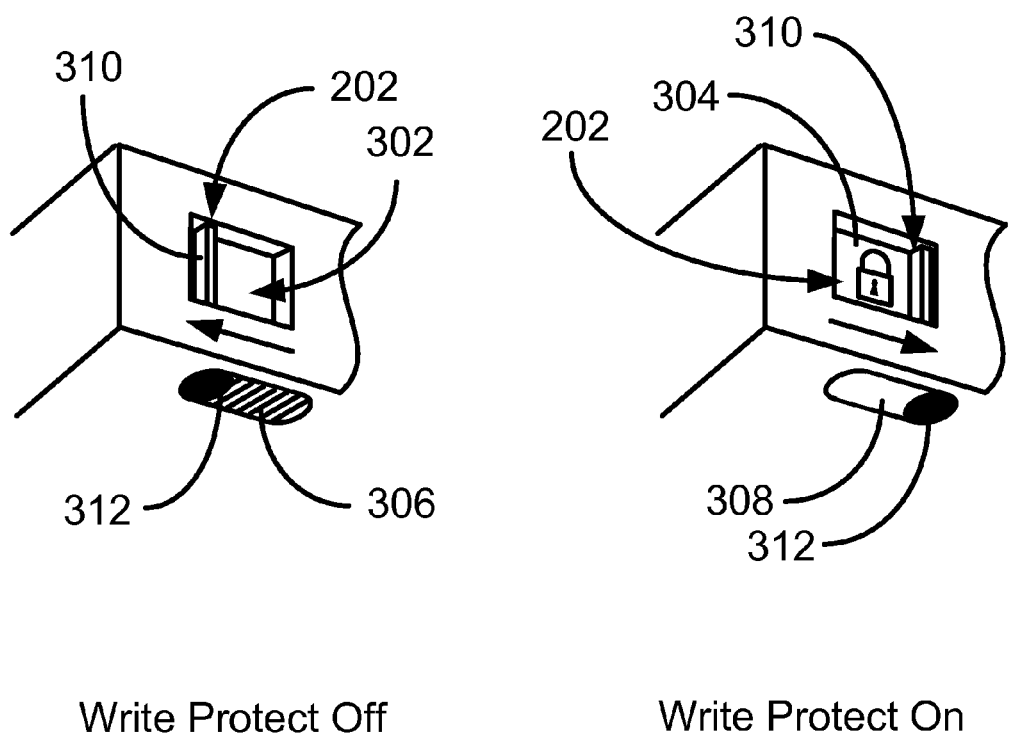
FIG. 3 illustratively depicts an embodiment of the write protect switch consistent with embodiments of the present invention.

FIG. 3 illustratively depicts an embodiment of the write protect switch 202 shown in more detail from FIG. 2A. In the depicted embodiment, the write protect switch 202 is a singular unit generally possessing a door 304, a lip 310 that protrudes from the door 304, and a knob 312, that is essentially flush with the tape cartridge housing 205. As shown, when the write protect switch 202 is in the closed state (image to the left), the tape cartridge 101 is physically identified by the tape drive 122 as a WMRM tape cartridge. In this state where the write protect is disabled, there is a write many opening 302. However, when the write protect is disabled, the knob 312 on the bottom of the tape cartridge 101 is in a closed position covering the write protect opening 308 with a plastic shield, or door, 306 (as depicted via the hash marks). When the write protect switch 202 is in the open state (image to the right), the tape cartridge 101 is physically identified by the tape drive 122 as a WORM tape cartridge. In this state where the write protect is enabled, the write many opening 302 is covered by a plastic (or other suitable material) shield, or door, 304 shown with a lock on the plastic shield 304. However, when the write protect is enabled, the knob 312 on the bottom of the tape cartridge 101 is in an open position whereby the write protect opening 302 is exposed allowing a pin (not shown) associated with the tape drive 122 to penetrate through the write protect opening 302 allowing the tape drive 122 to identify the tape cartridge 101 as a WORM tape cartridge.

Figure 4:
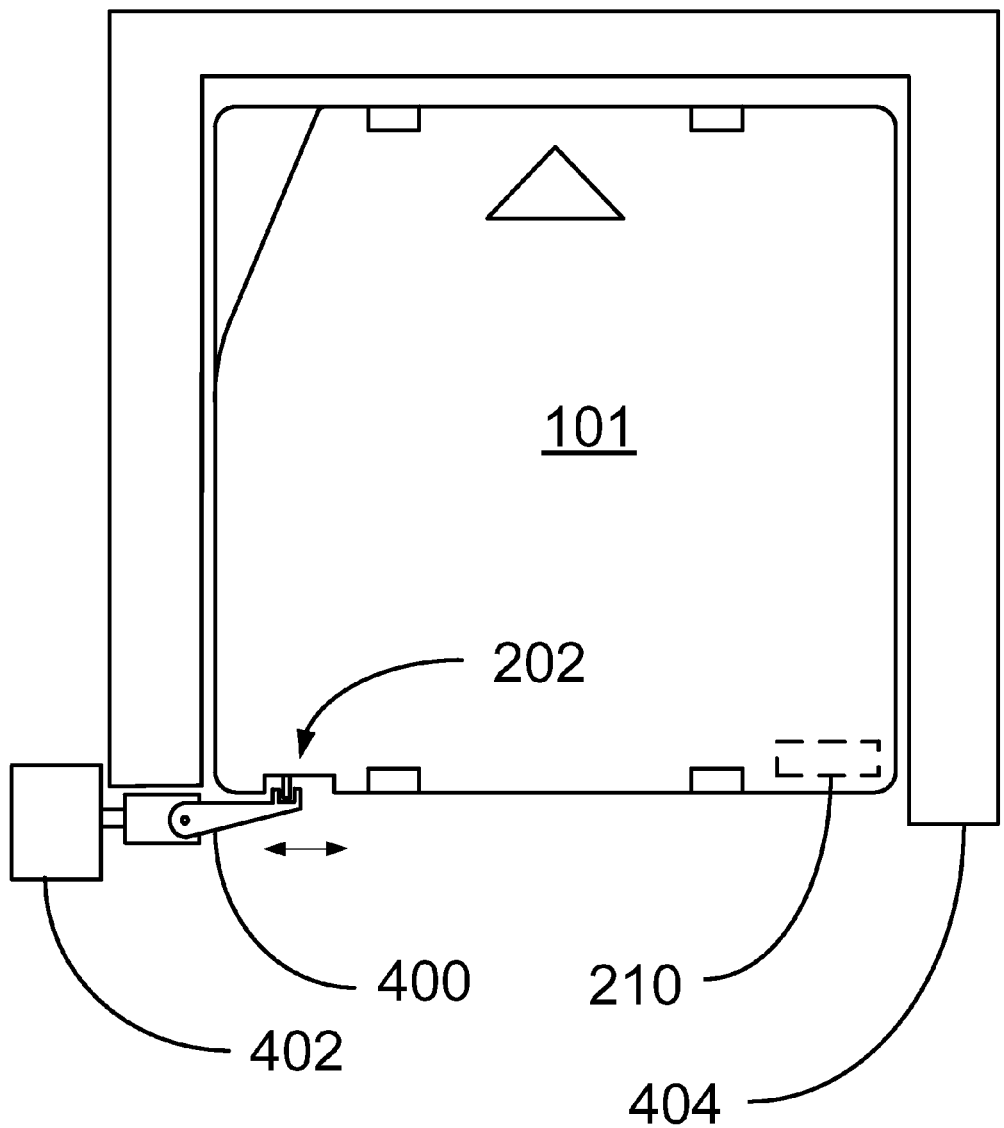
FIG. 4 illustratively depicts the Write protect switch toggling station consistent with embodiments of the present invention.

FIG. 4 illustratively depicts the Write protect switch toggling station 132 of FIG. 1 consistent with embodiments of the present invention. The Write protect switch toggling station 132 can generally provide a housing 404 that can accommodate a tape cartridge 101 when the arm 400 is pivoted in an unobstructed of location to allow the tape cartridge 101 to be slid into the Write protect switch toggling station 132. The arm 400 can be equipped with a mating feature capable of moving the write protect switch 202 to an opening closed position depicted by the two-way arrow. The Write protect switch toggling station 132 can further possess an actuator 402 to move the arm 400 in the direction of the two-way arrow. Other embodiments contemplate a mechanism to toggle the knob 312 similarly. FIG. 4 is an overly simplified illustration of the Write protect switch toggling station 132, which does not include locking mechanisms to hold the tape cartridge 101 in place, electrical wires, power cords, sensors, and other electromechanical parts that would be known to those skilled in the art.

Figure 5:
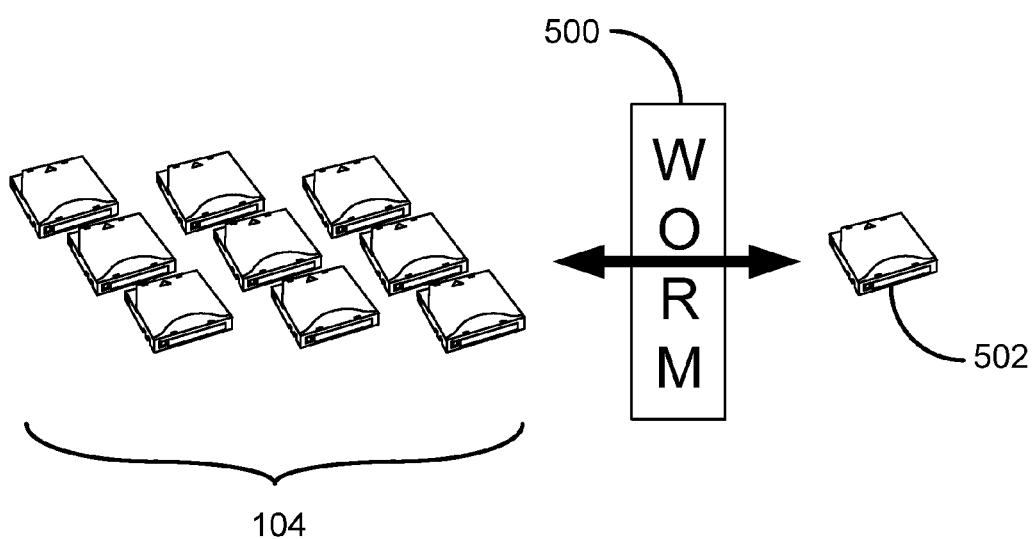
FIG. 5 depicts a simplified illustration of scratch pool tape cartridges comprising WMRM pool of tape cartridges and a WORM tape cartridge consistent with embodiments of the present invention.

FIG. 5 depicts a simplified illustration of scratch pool tape cartridges 101 that comprise WMRM pool 104 and WORM tape cartridge 502 consistent with embodiments of the present invention. The tape cartridges 101 from the WMRM pool 104 passes through the WORM function block 500 to become a WORM tape cartridge 502. The WORM function block 500 essentially cooperates with tape cartridges 101 to convert between WORM tape cartridges and WMRM tape cartridges consistent with the functional spirit of the WORM station 130.

Figure 6:
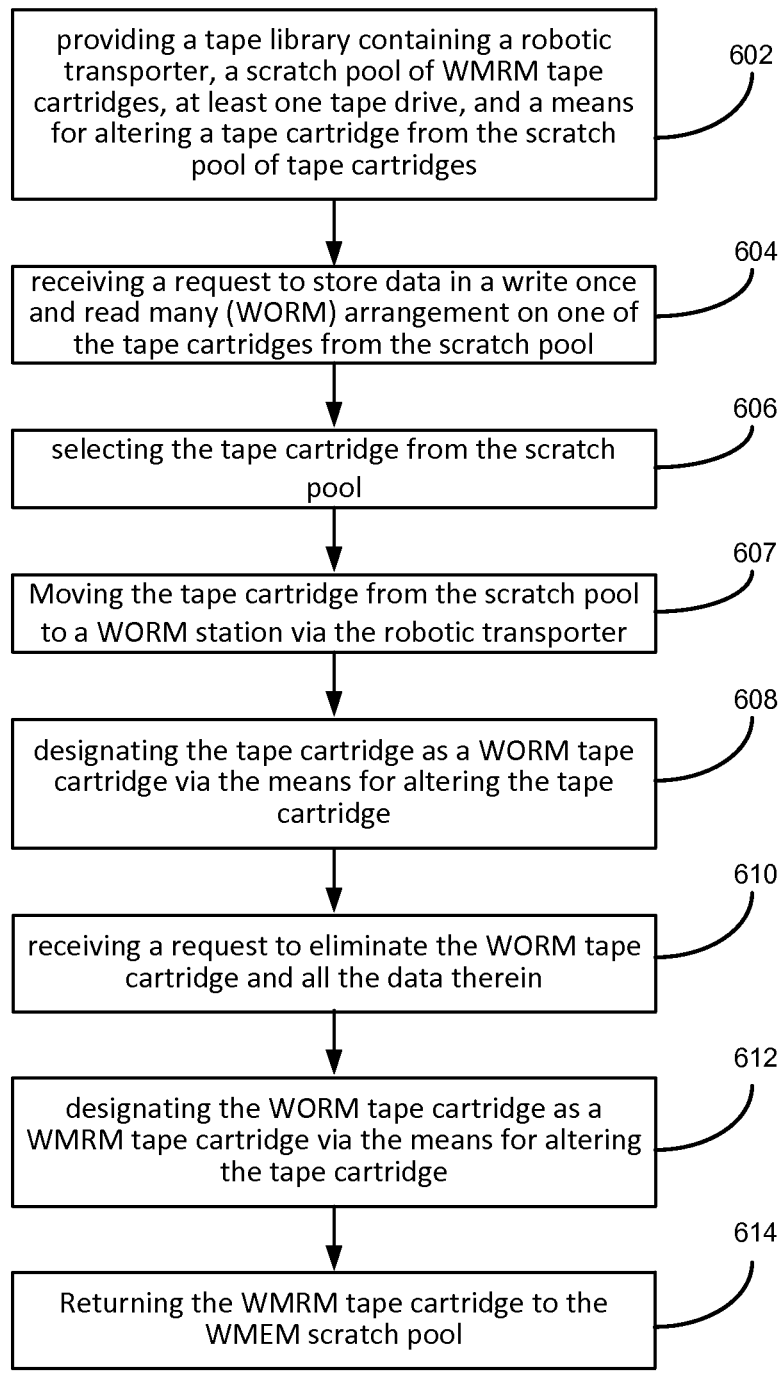
FIG. 6 depicts a method embodiment consistent with embodiments of the present invention.

FIG. 6 depicts a method embodiment consistent with embodiments of the present invention. In one embodiment, FIG. 6 can be described in conjunction with FIG. 5. Fundamentally, a data storage library 100 consistent with FIG. 1 is provided containing a scratch pool of WMRM tape cartridges 104, at least one tape drive 122, and a means for altering 500 a tape cartridge 101 between a WMRM tape cartridge and a WORM tape cartridge, block 602. In the present embodiment, though the WMRM tape cartridges 104, the at least one tape drive 122 generally and typically reside within the tape library 101, the means for altering 500 a tape cartridge 101 between a WMRM tape cartridge and a WORM tape cartridge is necessarily confined to and resides within the data storage library 100. In this embodiment, the data storage library 100 and the method of FIG. 6 would be in operable if the means for altering 500 a tape cartridge 101 between a WMRM tape cartridge and a WORM tape cartridge was not confined within the data storage library 100. The means for altering a tape cartridge 101 between WMRM and WORM states is shown in WORM function block 500. This can include a Write protect switch toggling station 132, which mechanically moves the Write protect switch 202 on the tape cartridge 101, and/or an RFID reader and writer 134 that designates a tape cartridge 101 to be either a WMRM tape cartridge 104 or a WORM tape cartridge 502 by transmitting the appropriate instructions to be stored to a MAM device in the tape cartridges 101.

With continued reference to FIG. 6, block 604 shows receiving a request to store data in a WORM arrangement on one of the tape cartridges 101 from the WMRM scratch pool 104. Certain embodiments contemplate the request received from a client 102, but other embodiments contemplate the request inputted by an operator, for example.

Method step 606 refers to selecting the tape cartridge 101 to be converted in a WORM configuration from the WMRM scratch pool 104. Selecting the tape cartridge 101 can be relegated to a predefined parameter associated with each of the tape cartridges 101. For example, because tape cartridges 208 converted to a WORM configuration will possibly never be over-written once data has been written to the tape medium 208, it may be advantageous to choose a tape cartridge 101 based on a predefined parameter such as a previously used tape cartridge. The predefined parameter is envisioned to include the most used tape cartridge having the most run time on it (e.g., the most reads and/or writes), a tape cartridge that has been previously written to the most, a tape cartridge that has been previously read the most, a tape cartridge that has been loaded the most times into a tape drive 122, a tape cartridge that has been simply used previously from a pool of tape cartridges that have never been used, a tape cartridge that has been previously used multiple times (that is more than once), the oldest tape cartridge in the WMRM pool 104 even if the oldest tape cartridge has never been used (oldest being defined as the earliest manufacturing date of the tape cartridge relative to all the other tape cartridges), one of the oldest tape cartridges in the WMRM pool 104, and the like.

Method step 607 is directed to moving the selected tape cartridge from the WMRM pool 104 to the means for altering 500 via a robotic transporter 110, all within the data storage library 100. The robotic transporter 110 possesses a picker device 112 that grasps tape cartridges 101 and is capable of moving the grasped tape cartridge 101 to and from the appropriate place at the means for altering 500. The robotic transport unit 110 helps provide the data storage library 100 the ability to alter write protect of a tape cartridge 101 all contained within the data storage library 100.

Method step 608 is directed to designating the selected tape cartridge from the WMRM pool 104 to a WORM tape cartridge 502 by the means for altering 500. This is depicted in FIG. 5 via the two-way arrow passing through the WORM function block 500. In this case, the selected tape cartridge will pass from the left side of the WORM function block 500 to the right side of the WORM function block 500.

Because, in the present embodiment, the WORM function block 500 is located within the data storage library 100, the WORM tape cartridge 502 can be reversed back to a WMRM tape cartridge 104 by passing through the WORM function block 500 from the right to the left using the robotic transport unit 110 and other mechanisms and devices without the intervention of human hands. This is featured in method step 610 whereby a request is received, by the client 102 for example, to eliminate the WORM tape cartridge 502 and all the data therein. This may be requested because the client 102 no longer wants the data on the WORM tape cartridge 502, wants to overwrite data to the WORM tape cartridge 502, wants to use the WORM tape cartridge 502 for a different purpose, etc. The request of step 610 is executed via the WORM function block 500, which designates the WORM tape cartridge 502 to a WMRM tape cartridge 104, as featured in method step 612. As shown in method block 614, once the WORM tape cartridge 502 has been converted back to a WMRM tape cartridge 104, it can be returned to the WMRM tape cartridge pool 104. Certain embodiments contemplate reserving a on the tape media 208, such as in the header of the tape media 208, that possesses instructions stored thereon indicating that the tape cartridges a WORM tape cartridge.

Figure 7:
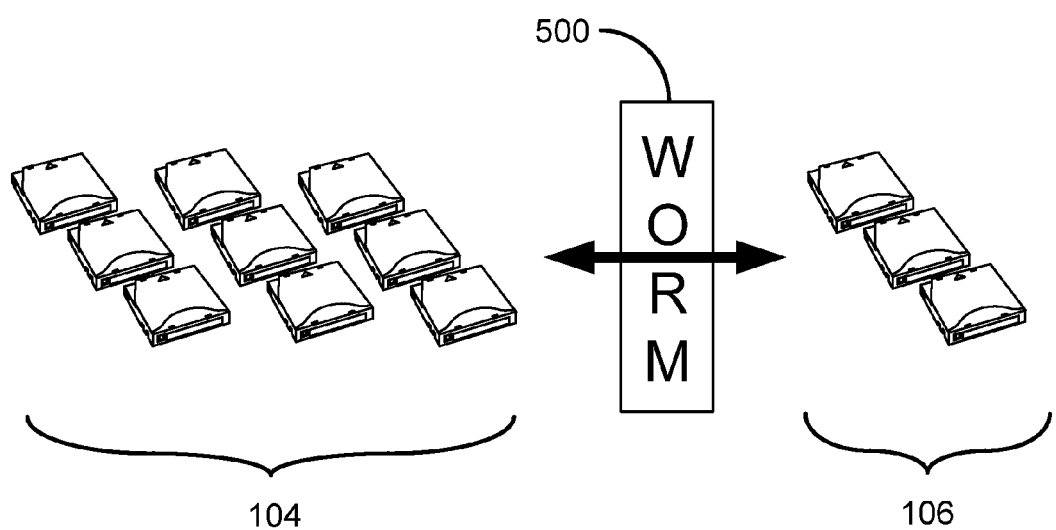
FIG. 7 depicts a simplified illustration of scratch pool tape cartridges comprising WMRM pool of tape cartridges and a WORM pool of tape cartridges consistent with embodiments of the present invention.

FIG. 7 depicts an embodiment whereby a pool of WORM tape cartridges 106 are created consistent with embodiments of the present invention. The simplified illustration depicts a scratch pool tape cartridges 101 which comprise WMRM pools 104 and WORM pools 106. The tape cartridges 101 from the WMRM pool 104 passes through the WORM function block 500 to become WORM tape cartridges forming the WORM pool 106. As described in conjunction with FIGS. 5 and 6, the WORM function block 500 essentially cooperates with tape cartridges 101 to convert between WORM tape cartridges and WMRM tape cartridges consistent with the functional spirit of the WORM station 130. WMRM tape cartridges from the scratch pool 104 can be selected to be converted into a scratch pool of WORM tape cartridges 106 consistent with parameters described in conjunction with FIGS. 5 and 6.

Figure 8:
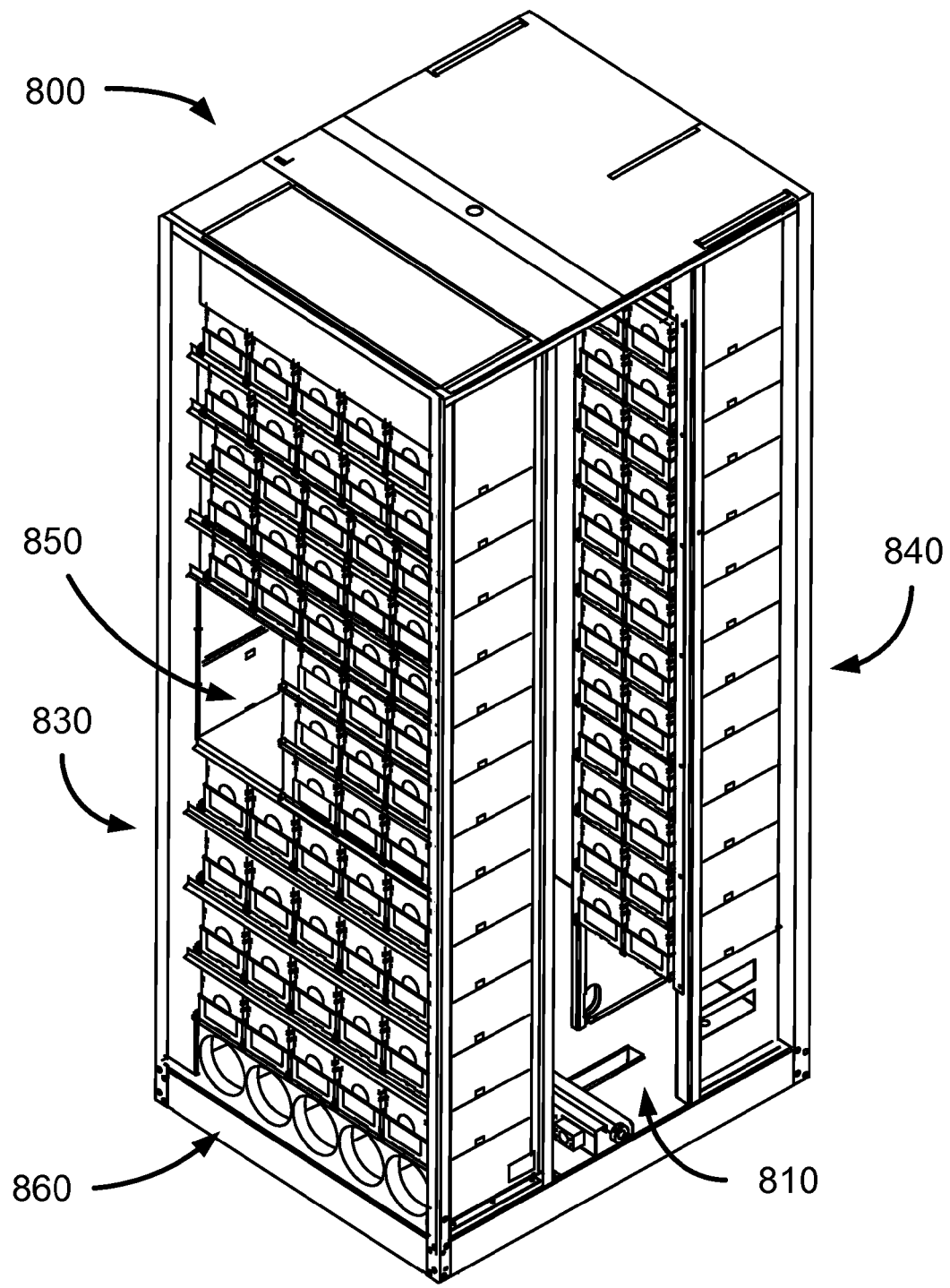
FIG. 8 shows a commercial embodiment of one T-950 library unit wherein aspects of the present invention can be practiced.

Embodiments of the present invention can be commercially practiced in a Spectra Logic T-Finity tape cartridge library manufactured by Spectra Logic of Boulder Colo., shown in FIG. 8. The T-Finity unit 800 comprises a first and second shelf system 830, 840 that are adapted to support a plurality of the removable storage devices, such as the tape cartridge magazines that contain a plurality of tape cartridges 101. The second shelf system 830 has at least one tape drive (not depicted) adapted to read and write data to and from a tape cartridge. Functionally interposed between the first and second shelf system 830, 840 is a magazine transport space 810. The magazine transport space 810 provides adequate space for a tape cartridge magazine (not depicted) to be moved, via a magazine transport (not depicted), from a position in the shelf system 830, 840 to a tape drive (not depicted). Tape cartridge magazines can be transferred into and out from the T-Finity library via the entry/exit port 850. The T-Finity tape library 800 includes a means for cooling as shown by the fans 860 located at the base. T-Finity unit 800 further comprises a WORM station 130 (not shown) to convert WMRM tape cartridges into WORM tape cartridges and back again.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, multiple or even predetermined pluralities of scratch pools can be managed for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though WORM tape cartridges may be selected from the scratch pool of WMRM tape cartridges based on a parameter, embodiments contemplate selecting a WMRM tape cartridge for conversion to a WORM tape cartridge based on random selection, some order of first chosen last chosen, new tape cartridges, all tape cartridges, downgrade older versions of tape cartridges, etc., for example, without departing from the scope and spirit of the claimed invention. Further, for purposes of illustration, a first and second tape drive 122 and tape cartridges 101 are used herein to simplify the description for a plurality of tape drives 122 and tape cartridges 101. Finally, although the preferred embodiments described herein are directed to tape drive systems, and related technology, it will be appreciated by those skilled in the art that the claimed technology can be applied to other systems, without departing from the spirit and scope of the present technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method comprising:
   providing a tape library containing a robotic transporter, a scratch pool of tape cartridges, at least one tape drive, and a means for altering a tape cartridge, from the scratch pool of tape cartridges, between a write many and read many (WMRM) arrangement and a write once and read many (WORM) arrangement;
   receiving a request to store data in the WORM arrangement on one of the tape cartridges from the scratch pool;
   selecting the tape cartridge from the scratch pool;
   moving the tape cartridge from the scratch pool to the means for altering the tape cartridge via the robotic transporter;
   designating the tape cartridge as a WORM tape cartridge via the means for altering the tape cartridge, the receiving step, the selecting step, and the designating step done entirely within the tape library.

2. The method of claim 1 wherein the tape cartridge is selected from the scratch pool of tape cartridges based on a predefined parameter.

3. The method of claim 2 wherein the predefined parameter is that the tape cartridge has been previously used.

4. The method of claim 2 wherein the predefined parameter is that the tape cartridge has been previously used multiple times.

5. The method of claim 2 wherein the predefined parameter is that the tape cartridge has been previously used more than any other tape cartridge in the scratch pool.

6. The method of claim 1 further comprising removing the designation as a worm tape cartridge and returning the tape cartridge back to the scratch pool of tape cartridges.

7. The method of claim 1 wherein the means for altering the tape cartridge is selected from a group consisting of toggling a mechanical switch comprised by the tape cartridge, storing WORM only instructions on a medium auxiliary memory (MAM) comprised by the tape cartridge, storing WORM only instructions on a header portion of the tape cartridge.

8. A method comprising:
   providing a tape library with a scratch pool of tape cartridges, at least one tape drive, a MAM reader and writer independent of the tape drive;
   receiving a request to store data in a write once and read many (WORM) arrangement on one of the tape cartridges from the scratch pool;

selecting a tape cartridge from the scratch pool;
moving the tape cartridge from the scratch pool to the MAM reader and writer via the robotic transporter;
designating the tape cartridge as a WORM tape cartridge by storing WORM only instructions on a MAM device located in the tape cartridge via the MAM reader and writer.

9. The method of claim 8 wherein the tape cartridge is selected from the scratch pool of tape cartridges based on a predefined parameter.

10. The method of claim 9 wherein the predefined parameter is that the tape cartridge has been previously used.

11. The method of claim 9 wherein the predefined parameter is that the tape cartridge has been previously used multiple times.

12. The method of claim 9 wherein the predefined parameter is that the tape cartridge has been previously used more than any other tape cartridge in the scratch pool.

13. The method of claim 8 further comprising removing the designation as a worm tape cartridge and returning the tape cartridge back to the scratch pool of tape cartridges.

14. The method of claim 8 further comprising toggling at least one bit in the MAM device to designate the tape cartridge as a WORM tape cartridge.

15. A method comprising:
providing a tape library containing a scratch pool of tape cartridges, at least one tape drive, and a means for altering a tape cartridge between a write many and read many arrangement and a write once and read many (WORM) arrangement, the scratch pool of tape cartridges;
receiving a request to store data in the WORM arrangement on one of the tape cartridges from the scratch pool;
selecting the tape cartridge from the scratch pool based on a predefined previous use parameter of the tape cartridge;
moving the tape cartridge from the scratch pool to the means for altering the tape cartridge via the robotic transporter; and
designating the tape cartridge as a WORM tape cartridge via the means for altering the tape cartridge, the receiving step, the selecting step, and the designating step done entirely within the tape library.

16. The method of claim 15 wherein the parameter is that the tape cartridge has been previously used more than two times.

17. The method of claim 15 wherein the predefined parameter is that the tape cartridge has been previously used more than any other tape cartridge in the scratch pool.

18. The method of claim 15 further comprising removing the designation as a worm tape cartridge and returning the tape cartridge back to the scratch pool of tape cartridges.

19. The method of claim 15 wherein the means for altering the tape cartridge is storing WORM only instructions on a MAM comprised by the tape cartridge wherein the tape library contains a MAM reader and writer device therein.

20. The method of claim 15 wherein the means for altering the tape cartridge is selected from a group consisting of toggling a mechanical switch comprised by the tape cartridge, storing WORM only instructions on a MAM comprised by the tape cartridge, storing WORM only instructions on a header portion of the tape cartridge.

* * * * *